US012810798B2

(12) United States Patent
Lee et al.

(10) Patent No.: US 12,810,798 B2
(45) Date of Patent: Nov. 24, 2026

(54) PIXEL, DISPLAY DEVICE, AND ELECTRONIC DEVICE

(71) Applicant: Samsung Display Co., LTD., Yongin-si (KR)

(72) Inventors: Seung Kyu Lee, Yongin-si (KR); Min Seong Son, Yongin-si (KR); Min Jun Kim, Yongin-si (KR); Jae June Park, Yongin-si (KR); Jun Yi Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/191,533

(22) Filed: Apr. 28, 2025

(65) Prior Publication Data

US 2026/0094566 A1 Apr. 2, 2026

(30) Foreign Application Priority Data

Sep. 30, 2024 (KR) ........................ 10-2024-0133103
Oct. 24, 2024 (KR) ........................ 10-2024-0146915

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0257* (2013.01)

(58) Field of Classification Search
CPC ......... G09G 3/3233; G09G 2300/0819; G09G 2300/0852; G09G 2300/0861; G09G 2310/08; G09G 2320/0257
See application file for complete search history.

(56) References Cited

U.S. PATENT DOCUMENTS

| | | | |
|---|---|---|---|
| 7,015,884 B2 | 3/2006 | Kwon | |
| 11,996,049 B2 | 5/2024 | No et al. | |
| 12,008,952 B2 * | 6/2024 | Yang | G09G 3/3233 |
| 2016/0321994 A1 * | 11/2016 | Lee | H10K 59/1216 |

(Continued)

FOREIGN PATENT DOCUMENTS

| | | | |
|---|---|---|---|
| CN | 108987438 A * | 12/2018 | H10K 59/124 |
| KR | 10-0370286 | 1/2003 | |

(Continued)

*Primary Examiner* — Jose R Soto Lopez
(74) *Attorney, Agent, or Firm* — Sughrue Mion, PLLC

(57) ABSTRACT

A pixel includes a first transistor including a gate electrode connected to a first node and connected between a first driving power source node and a second node; a second transistor connected between a data line and a third node and including a gate electrode connected to a first scan line; a third transistor connected between the first node and the second node and including a gate electrode connected to a second scan line; a fourth transistor connected between an initialization power source node and the first node and including a gate electrode connected to a third scan line; a fifth transistor connected between a reference power source node and the third node; a sixth transistor connected between the second node and a fourth node and including a gate electrode connected to an emission control line; and a light emitting element connected to the fourth node.

20 Claims, 7 Drawing Sheets

(56) References Cited

U.S. PATENT DOCUMENTS

| | | | | |
|---|---|---|---|---|
| 2017/0186375 | A1* | 6/2017 | Jung | G09G 3/3233 |
| 2021/0375193 | A1* | 12/2021 | Son | G09G 3/3233 |
| 2022/0028333 | A1* | 1/2022 | Jeong | G09G 3/3275 |
| 2022/0270546 | A1* | 8/2022 | Kim | G09G 3/3266 |
| 2024/0062710 | A1* | 2/2024 | Park | G09G 3/32 |
| 2024/0194139 | A1 | 6/2024 | Noh et al. | |
| 2024/0274079 | A1* | 8/2024 | Lee | G09G 3/2092 |
| 2025/0384802 | A1* | 12/2025 | Lee | G09G 3/20 |
| 2026/0033171 | A1* | 1/2026 | Kim | G09G 3/3233 |

FOREIGN PATENT DOCUMENTS

| | | |
|---|---|---|
| KR | 10-2023-0160694 | 11/2023 |
| KR | 10-2024-0087421 | 6/2024 |

* cited by examiner

PIXEL, DISPLAY DEVICE, AND ELECTRONIC DEVICE

CROSS-REFERENCE TO RELATED APPLICATION(S)

This application claims priority to Korean Patent Application No. 10-2024-0133103, filed on Sep. 30, 2024, and Korean Patent Application No. 10-2024-0146915 under 35 U.S.C. § 119, filed on Oct. 24, 2024, the entire contents of which are incorporated herein by reference.

BACKGROUND

1. Technical Field

Embodiments relate to a pixel, a display device, and an electronic device.

2. Description of the Related Art

The importance of display devices is increasing along with the development of multimedia. The use of display devices such as an organic light emitting display (OLED) device and a liquid crystal display (LCD) device is increasing.

A display device includes a plurality of pixels. Each of the pixels includes a plurality of transistors, a light emitting element electrically connected to the transistors, and a capacitor. The transistors generate driving current based on signals provided through signal lines, and the light emitting element emits light based on the driving current. However, the driving current may leak inside the pixels, and an afterimage or the like may be visually recognized in an image. This may result in a deterioration in display quality.

The above description is for helping the understanding of the background art for the technical ideas of the disclosure. Therefore, it should not be understood as the contents corresponding to the prior art known to those skilled in the art to which the disclosure pertains.

SUMMARY

An object of embodiments is to provide a pixel, a display device, and an electronic device having improved display quality. For example, according to the display device, by increasing a period during which an off-bias voltage is applied to a driving transistor, a phenomenon in which an afterimage is visually recognized in an image is prevented, thereby improving display quality.

However, embodiments are not limited to those set forth herein. The above and other embodiments will become more apparent to one of ordinary skill in the art to which the disclosure pertains by referencing the detailed description of the disclosure given below.

A pixel according to embodiments may include a first transistor including a gate electrode connected to a first node and connected between a second node and a first driving power source node to which a first driving power source is supplied; a second transistor connected between a data line and a third node and including a gate electrode electrically connected to a first scan line; a third transistor connected between the first node and the second node and including a gate electrode electrically connected to a second scan line; a fourth transistor connected between the first node and an initialization power source node to which an initialization power source is supplied and including a gate electrode electrically connected to a third scan line; a fifth transistor connected between the third node and a reference power source node to which a reference power source is supplied and including a gate electrode electrically connected to the second scan line; a sixth transistor connected between the second node and a fourth node and including a gate electrode electrically connected to an emission control line; and a light emitting element connected to the fourth node, and in a non-emission period in which the sixth transistor is turned off, at least one second scan signal may be applied to the second scan line, and after the at least one second scan signal is applied, an off-bias voltage may be applied to the first transistor during a bias period.

In an embodiment, during the bias period, a voltage obtained by subtracting a voltage of a source electrode from a voltage of the gate electrode of the first transistor may have a positive voltage.

In an embodiment, the pixel may further include a seventh transistor connected between the initialization power source node and the fourth node and including a gate electrode electrically connected to a fourth scan line; and a second capacitor connected between the first driving power source node and the third node.

In an embodiment, the first, second, third, fourth, fifth, sixth, and seventh transistors may be P-type low-temperature poly-silicon (LTPS) transistors.

In an embodiment, the bias period may be set to one horizontal period or more.

In an embodiment, in the non-emission period, the second scan signal may be applied during a first period, and a first scan signal may be applied to the first scan line during a second period after the first period, and the bias period may be a period between the first period and the second period.

In an embodiment, in the non-emission period, the second scan signal may be applied again during a third period after the second period, and a third scan signal may be applied to the third scan line during a fourth period after the third period, and the bias period may be a period between the third period and the fourth period.

In an embodiment, during the first period, the third and fifth transistors may be turned on, and a voltage obtained by subtracting a threshold voltage of the first transistor from a voltage of the first driving power source may be applied to the gate electrode of the first transistor.

In an embodiment, during the second period, the fourth transistor may be turned on, and a voltage of the initialization power source may be applied to the gate electrode of the first transistor.

In an embodiment, in the non-emission period, a first scan signal may be applied to the first scan line during a first period, a second scan signal may be applied during a second period after the first period, and a third scan signal may be applied to the third scan line during a third period after the second period, and the bias period may be a period between the second period and the third period.

In an embodiment, during the second period, the third and fifth transistors may be turned on, and a voltage obtained by subtracting a threshold voltage of the first transistor from a voltage of the first driving power source may be applied to the gate electrode of the first transistor.

In an embodiment, during the third period, the second transistor may be turned on, and a voltage of the data line may be applied to the gate electrode of the first transistor.

A display device according to embodiments may include pixels connected to scan lines, emission control lines, and data lines; and a scan driver driving the scan lines. Each of the pixels may include a first transistor including a gate electrode connected to a first node and connected between a second node and a first driving power source node to which a first driving power source is supplied; a second transistor connected between a data line and a third node and including a gate electrode electrically connected to a first scan line; a third transistor connected between the first node and the second node and including a gate electrode electrically connected to a second scan line; a fourth transistor connected between the first node and an initialization power source node to which an initialization power source is supplied and including a gate electrode electrically connected to a third scan line; a fifth transistor connected between the third node and a reference power source node to which a reference power source is supplied and including a gate electrode electrically connected to the second scan line; a sixth transistor connected between the second node and a fourth node and including a gate electrode electrically connected to an emission control line; and a light emitting element connected to the fourth node, and in a non-emission period in which the sixth transistor is turned off, at least one second scan signal may be applied to the second scan line, and after the at least one second scan signal is applied, an off-bias voltage may be applied to the first transistor during a bias period.

In an embodiment, during the bias period, a voltage obtained by subtracting a voltage of a source electrode from a voltage of the gate electrode of the first transistor may have a positive voltage.

In an embodiment, the display device may further include a seventh transistor connected between the initialization power source node and the fourth node and including a gate electrode electrically connected to a fourth scan line; and a second capacitor connected between the first driving power source node and the third node.

In an embodiment, the bias period may be set to one horizontal period or more.

In an embodiment, in the non-emission period, the second scan signal may be applied during a first period, and a first scan signal may be applied to the first scan line during a second period after the first period, and the bias period may be a period between the first period and the second period.

In an embodiment, in the non-emission period, the second scan signal may be applied again during a third period after the second period, and a third scan signal may be applied to the third scan line during a fourth period after the third period, and the bias period may be a period between the third period and the fourth period.

In an embodiment, in the non-emission period, a first scan signal may be applied to the first scan line during a first period, a second scan signal may be applied during a second period after the first period, and a third scan signal may be applied to the third scan line during a third period after the second period, and the bias period may be a period between the second period and the third period.

An electronic device according to embodiments may include a display device including pixels; and a processor controlling the display device. Each of the pixels may include a first transistor including a gate electrode connected to a first node and connected between a second node and a first driving power source node to which a first driving power source is supplied; a second transistor connected between a data line and a third node and including a gate electrode electrically connected to a first scan line; a third transistor connected between the first node and the second node and including a gate electrode electrically connected to a second scan line; a fourth transistor connected between the first node and an initialization power source node to which an initialization power source is supplied and including a gate electrode electrically connected to a third scan line; a fifth transistor connected between the third node and a reference power source node to which a reference power source is supplied and including a gate electrode electrically connected to the second scan line; a sixth transistor connected between the second node and a fourth node and including a gate electrode electrically connected to an emission control line; and a light emitting element connected to the fourth node, and in a non-emission period in which the sixth transistor is turned off, at least one second scan signal may be applied to the second scan line, and after the at least one second scan signal is applied, an off-bias voltage may be applied to the first transistor during a bias period.

BRIEF DESCRIPTION OF THE DRAWINGS

The accompanying drawings, which are included to provide a further understanding of the disclosure, and are incorporated in and constitute a part of this specification, illustrate exemplary embodiments, and, together with the description, serve to explain principles of the disclosure.

DETAILED DESCRIPTION OF THE EMBODIMENTS

Figure 1:
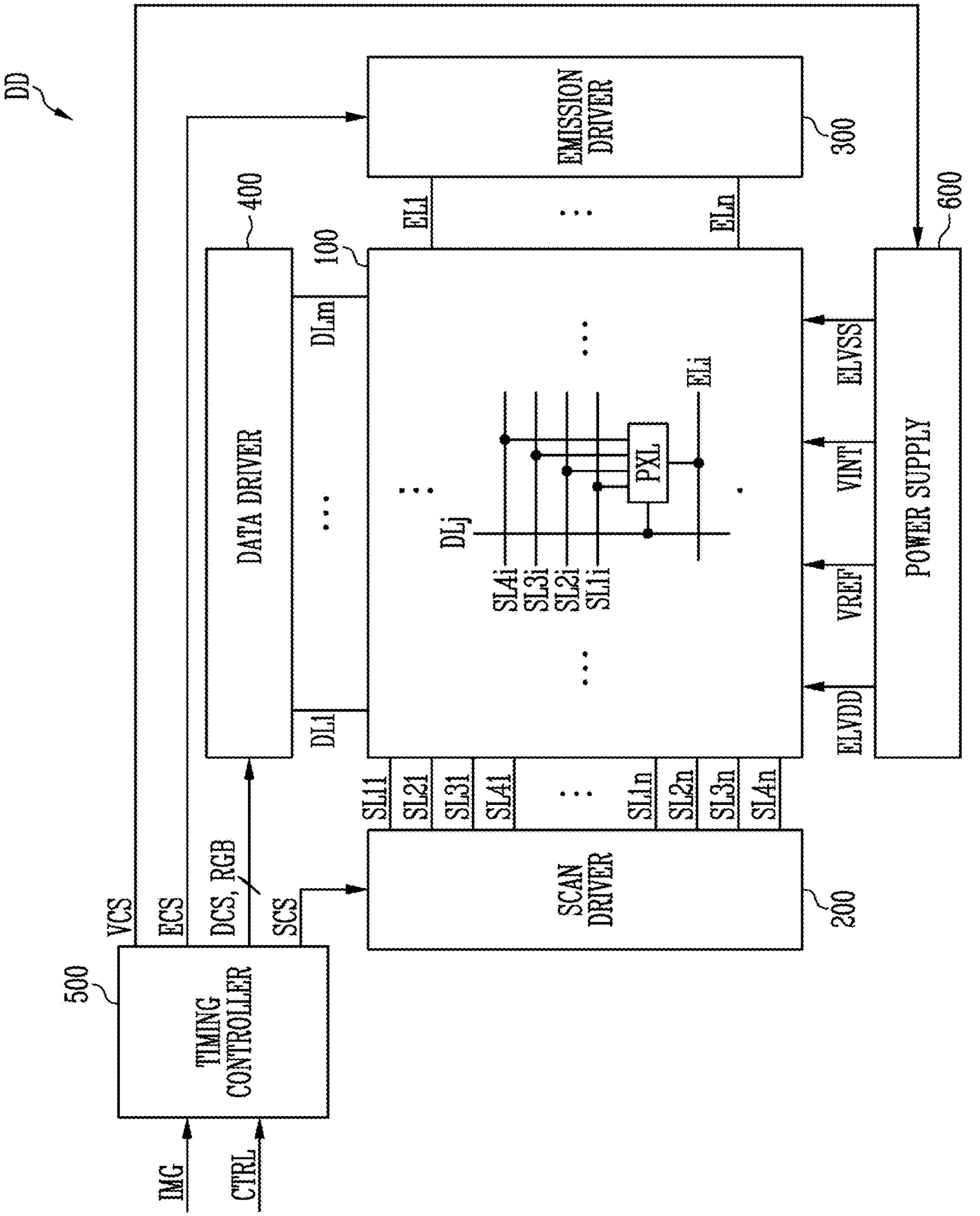
FIG. 1 is a schematic block diagram of a display device according to an embodiment.

In the following description, for the purposes of explanation, numerous specific details are set forth in order to provide a thorough understanding of various embodiments or implementations of the invention. As used herein, "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the axis of the first direction DR1, the axis of the second direction DR2, and the axis of the third direction DR3 are not limited to three axes of a rectangular coordinate system, such as the X, Y, and Z—axes, and may be interpreted in a broader sense. For example, the axis of the first direction DR1, the axis of the second direction DR2, and the axis of the third direction DR3 may be perpendicular to one another, or may represent different directions that are not perpendicular to one another. For the purposes of this disclosure, "at least one of A and B" may be understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

FIG. 1 is a schematic block diagram of a display device according to an embodiment.

Referring to FIG. 1, a display device DD according to an embodiment may include a display panel 100, a scan driver 200, an emission driver 300, a data driver 400, and a timing controller 500.

The display panel 100 may include pixels PXL connected to data lines DL1 to DLm, scan lines SL11 to SL**1*n*, SL21 to SL2*n*, SL31 to SL3*n*, and SL41 to SL4*n*, and emission control lines EL1** to ELn. The pixels PXL may receive a first driving power source ELVDD, a second driving power source ELVSS, an initialization power source VINT, and a reference power source VREF from the outside.

The pixels PXL may be connected to the scan driver 200 through the scan lines SL11 to SL1*n*, SL21 to SL2*n*, SL31 to SL3*n*, and SL41 to SL4*n*. The pixels PXL may be connected to the emission driver 300 through the emission control lines EL1 to ELn. The pixels PXL may be connected to the data driver 400 through the data lines DL1 to DLm.

In some embodiments, a pixel arranged in an i-th row (i may be a natural number) and a j-th column (j may be a natural number) may be connected to scan lines SL1*i*, SL2*i*, SL3*i*, and SL4*i* corresponding to an i-th pixel row, an emission control line ELi corresponding to the i-th pixel row, and a data line DLj corresponding to a j-th pixel column. However, embodiments are not limited thereto. For example, signal lines connected to the pixels PXL may be set in various ways corresponding to the circuit structure of the pixels PXL.

Each of the pixels PXL may include at least one light emitting element that generates light. Accordingly, each of the pixels PXL may generate light of a specific color, such as red, green, blue, cyan, magenta, yellow, or the like.

The scan driver 200 may generate a scan signal based on a scan control signal SCS. The scan driver 200 may sequentially provide the scan signal to the scan lines SL11 to SL1*n*, SL21 to SL2*n*, SL31 to SL3*n*, and SL41 to SL4*n*. For example, the scan control signal SCS may include a start signal, clock signals, and the like, and may be provided from the timing controller 500. For example, the scan driver 200 may include a shift register (or stage) that sequentially generates and outputs the scan signal having a pulse shape corresponding to the start signal having a pulse shape using the clock signals.

The scan driver 200 may be disposed on a side of the display panel 100. However, embodiments are not limited thereto. For example, the scan driver 200 may be divided into two or more drivers that are physically and/or logically separated. Such drivers may be disposed on the side of the display panel 100 and another side of the display panel 100 opposite to the side. For example, the scan driver 200 may be disposed around the display panel 100 in various forms according to embodiments.

The emission driver 300 may generate an emission control signal based on an emission driving control signal ECS. The emission driver 300 may provide the emission control signal to the emission control lines EL1 to ELn sequentially or simultaneously. For example, the emission driving control signal ECS may include an emission start signal, emission clock signals, and the like, and may be provided from the timing controller 500. For example, the emission driver 300 may include a shift register that sequentially generates and outputs the emission control signal having a pulse shape corresponding to the emission start signal having a pulse shape using the emission clock signals.

The data driver 400 may receive a data control signal DCS and image data RGB from the timing controller 500. The data driver 400 may supply a data signal to the data lines DL1 to DLm in response to the data control signal DCS. As an example, the data driver 400 may generate the data signal in analog form using the image data RGB in digital form and supply the generated data signal to the data lines DL1 to DLm in synchronized with the scan signal.

The timing controller 500 may control all operations of the display device DD. The timing controller 500 may receive input image data IMG and a control signal CTRL for controlling its display from the outside. The timing controller 500 may generate the scan control signal SCS, the emission driving control signal ECS, the data control signal DCS, and a voltage control signal VCS in response to the control signal CTRL. For example, the timing controller 500 may rearrange the input image data IMG into the image data RGB and supply the image data RGB to the data driver 400.

In some embodiments, the display device DD may further include a power supply 600 for supplying a voltage of the first driving power source ELVDD, a voltage of the second driving power source ELVSS, a voltage of the initialization power source VINT, and a voltage of the reference power source VREF to the display panel 100.

The power supply 600 may operate in response to the voltage control signal VCS supplied from the timing controller 500. For example, the power supply 600 may an input voltage from the outside of the display device DD, adjust the received voltage, and generate a plurality of voltages by regulating the adjusted voltage.

The first driving power source ELVDD and the second driving power source ELVSS may be used to drive the light emitting element. For example, the voltage of the first driving power source ELVDD may be set to a higher level than the voltage of the second driving power source ELVSS. For example, the first driving power source ELVDD may be a positive voltage, and the second driving power source ELVSS may be a negative voltage.

The initialization power source VINT may be a power source that initializes the pixels PXL. For example, driving transistors included in the pixels PXL may be initialized by the voltage of the initialization power source VINT. The initialization power source VINT may be set to a lower voltage than the data signal.

The reference power source VREF may be a power source that initializes the pixels PXL. For example, capacitors and/or transistors included in the pixels PXL may be initialized by the voltage of the reference power source VREF. The reference power source VREF may be a positive voltage. For example, the reference power source VREF may have the same voltage level as the first driving power source ELVDD, but embodiments are not limited thereto.

Two or more components of the data driver 400, the timing controller 500, and the power supply 600 may be mounted in a single integrated circuit. For example, the data driver 400, the timing controller 500, and the power supply 600 may be included in a driver integrated circuit DIC. For example, the data driver 400, the timing controller 500, and the power supply 600 may be functionally separated components within a single driver integrated circuit DIC. In other embodiments, at least one of the data driver 400, the timing controller 500, and the power supply 600 may be provided as a separate component from the driver integrated circuit DIC.

Figure 2:
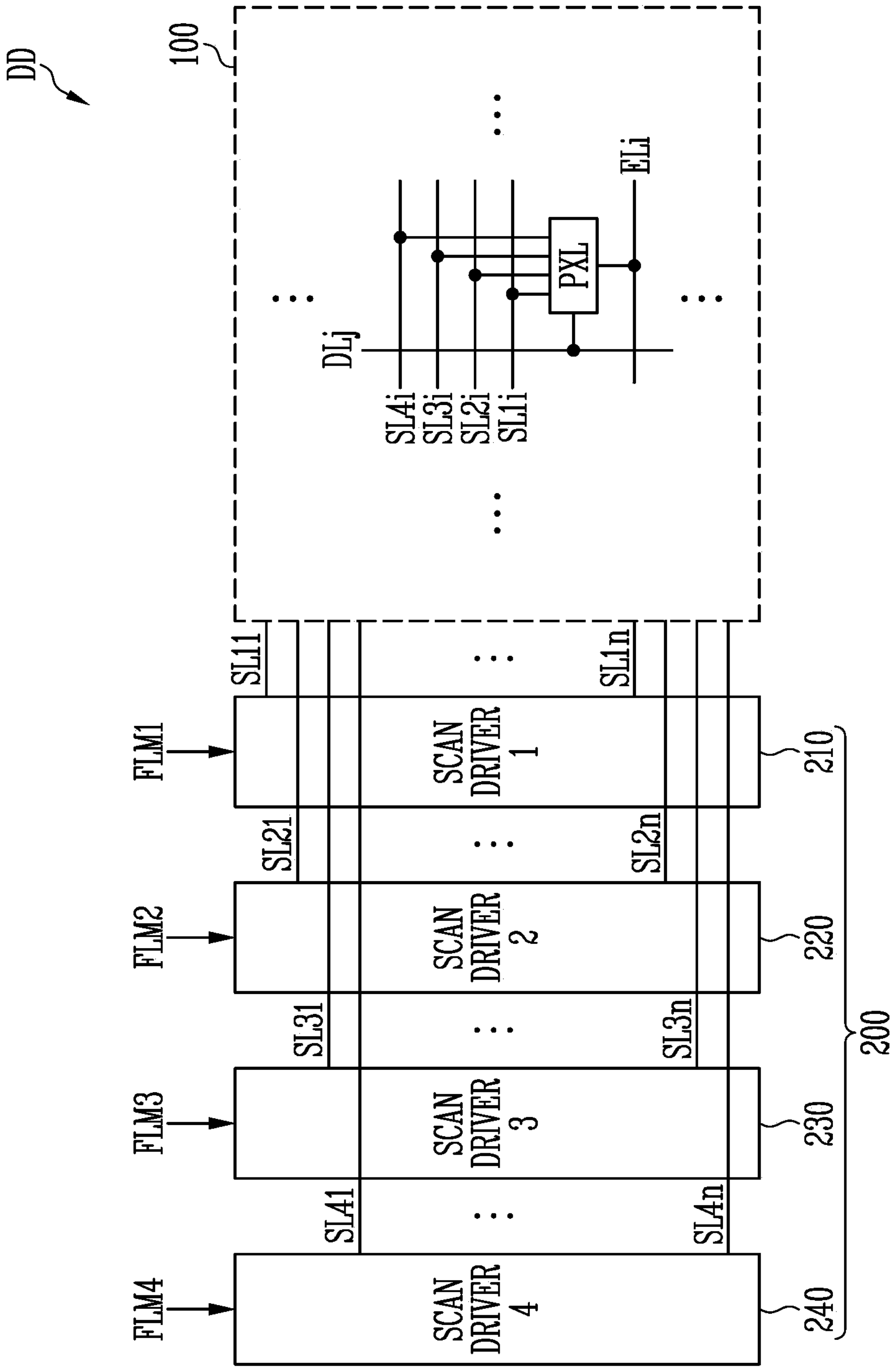
FIG. 2 is a schematic block diagram illustrating an embodiment of a scan driver included in the display device of FIG. 1.

FIG. 2 is a schematic block diagram illustrating an embodiment of a scan driver included in the display device of FIG. 1.

Referring to FIGS. 1 and 2, the scan driver 200 may include a first scan driver 210, a second scan driver 220, a third scan driver 230, and a fourth scan driver 240.

The scan driver 200 may receive the scan control signal SCS from the timing controller 500 and may apply a first scan signal, a second scan signal, a third scan signal, and a fourth scan signal to first scan lines S11 to S1*n*, second scan lines S21 to S2*n*, third scan lines S31 to S3*n*, and the fourth scan lines S41 to S4*n*, respectively, based on the scan control signal SCS.

The first to fourth scan signals may be set to a gate-on voltage (for example, a low voltage) corresponding to the type of transistors to which corresponding scan signals are applied. A transistor receiving the scan signal may be set to a turned-on state in case that the scan signal is applied. For example, the gate-on voltage of the scan signal applied to a P-type transistor may be a logic low level, and the gate-on voltage of the scan signal applied to an N-type transistor may be a logic high level. Hereinafter, the expression "the scan signal is applied" may be understood as the scan signal being applied at a logic level that turns on the transistor controlled by the scan signal.

In an embodiment, the scan driver 200 may supply some of the first to fourth scan signals multiple times during a non-emission period. Accordingly, an off-bias voltage may be applied to driving transistors included in the pixels PXL.

The scan control signal SCS may include first to fourth scan start signals FLM1 to FLM4. The first to fourth scan start signals FLM1 to FLM4 may be applied to the first to fourth scan drivers 210 to 240, respectively.

The width, application timing, and the like of the first to fourth scan start signals FLM1 to FLM4 may be determined according to the driving conditions of the pixels PXL and the frame frequency. The first to fourth scan signals may be applied based on the first to fourth scan start signals FLM1 to FLM4, respectively. For example, the timing at which at least one of the first to fourth scan signals is applied may be different from the timing at which the remaining signals are applied.

The first scan driver 210 may sequentially apply the first scan signal to the first scan lines S11 to S1*n* in response to the first scan start signal FLM1. The second scan driver 220 may sequentially apply the second scan signal to the second scan lines S21 to S2*n* in response to the second scan start signal FLM2. The third scan driver 230 may sequentially apply the third scan signal to the third scan lines S31 to S3*n* in response to the third scan start signal FLM3. The fourth scan driver 240 may sequentially apply the fourth scan signal to the fourth scan lines S41 to S4*n* in response to the fourth scan start signal FLM4.

Figure 3:
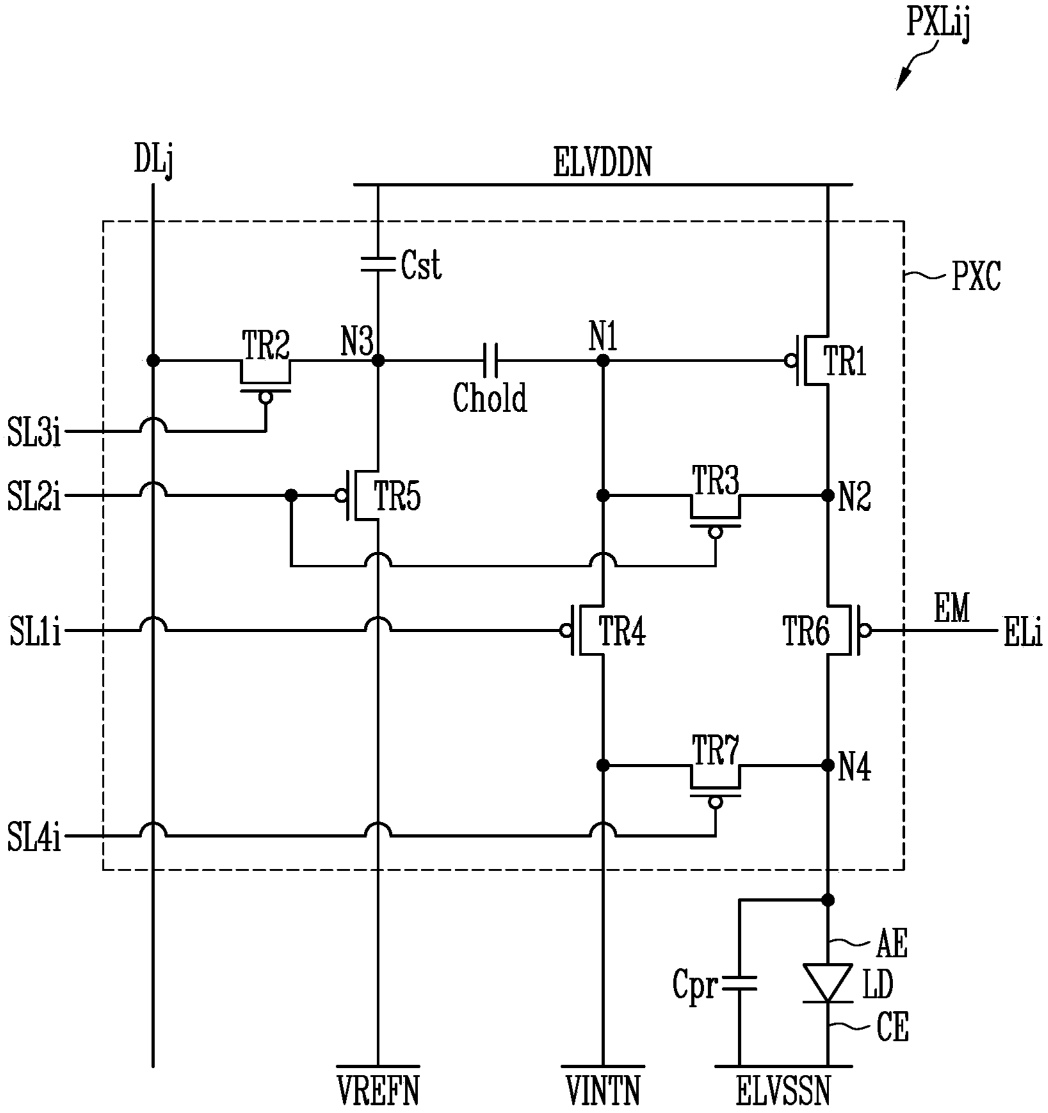
FIG. 3 is a schematic diagram of an equivalent circuit of an embodiment of one of pixels of FIG. 2.

FIG. 3 is a schematic diagram of an equivalent circuit of an embodiment of one of pixels of FIG. 2.

Referring to FIG. 3, a pixel PXLij may include a pixel circuit PXC and a light emitting element LD.

The pixel circuit PXC may be connected to an i-th first scan line SL1*i*, an i-th second scan line SL2*i*, an i-th third scan line SL3*i*, an i-th fourth scan line SL4*i*, an i-th emission control line ELi, and a j-th data line DLj.

In some embodiments, the pixel circuit PXC may include first to seventh transistors TR1 to TR7. For example, the first to seventh transistors TR1 to TR7 may be P-type low-temperature poly-silicon (LTPS) transistors. Accordingly, a gate-on voltage for turning on the first to seventh transistors TR1 to TR7 may be a logic low level. However, embodiments are not limited thereto.

The first transistor TR1 may be connected between a first driving power source node ELVDDN and a second node N2. A gate electrode of the first transistor TR1 may be connected to a first node N1. Accordingly, the first transistor TR1 may be turned on in response to a voltage of the first node N1. The first transistor TR1 may control the amount of current flowing from the first driving power source node ELVDDN to a second driving power source node ELVSSN via the light emitting element LD in response to the voltage of the first node N1. The first transistor TR1 may be referred to as a driving transistor.

The second transistor TR2 may be connected between the j-th data line DLj and a third node N3. A gate electrode of the second transistor TR2 may be connected to the i-th third scan line SL3*i*. Accordingly, the second transistor TR2 may be turned on in response to a scan signal of the i-th third scan line SL3*i*. The second transistor TR2 may be referred to as a switching transistor.

The third transistor TR3 may be connected between the first node N1 and the second node N2. A gate electrode of the third transistor TR3 may be connected to the i-th second scan line SL2*i*. Accordingly, the third transistor TR3 may be turned on in response to a scan signal of the i-th second scan line SL2*i*.

The fourth transistor TR4 may be connected between the first node N1 and an initialization power source node VINTN. The first node N1 may be a node connected to the gate electrode of the first transistor TR1. The initialization power source node VINTN may transmit (or transfer) an initialization voltage. In some embodiments, the initialization voltage may be provided by the power supply 600 of FIG. 1. In other embodiments, the initialization voltage may be provided by an external device.

A gate electrode of the fourth transistor TR4 may be connected to the i-th first scan line SL1*i*. Accordingly, the fourth transistor TR4 may be turned on in response to a scan signal of the i-th first scan line SL1*i*. In case that the fourth transistor TR4 is turned on, a voltage of the initialization power source node VINTN may be applied to the first node N1. In case that the voltage of the initialization power source node VINTN is higher than a selected reference value, a voltage of a parasitic capacitor Cpr in the light emitting element LD may be charged rather than discharged. Accordingly, the voltage of the initialization power source node VINTN may be set to a lower level than a voltage of the second driving power source node ELVSSN.

The fifth transistor TR5 may be connected between the third node N3 and a reference power source node VREFN. A gate electrode of the fifth transistor TR5 may be connected to the i-th second scan line SL2*i*. Accordingly, the fifth transistor TR5 may be turned on in response to the scan signal of the i-th second scan line SL2*i*. In case that the fifth transistor TR3 is turned on, a voltage of the reference power source node VREFN may be applied to the third node N3.

A gate electrode of the fifth transistor TR5 may be connected to the gate electrode of the third transistor TR3. The fifth transistor TR5 and the third transistor TR3 may be controlled by substantially the same voltage applied through the i-th second scan line SL2*i*.

The sixth transistor TR6 may be connected between the second node N2 and a fourth node N4. The second node N2 may be a node connected to an electrode (for example, a drain electrode) of the first transistor TR1. The fourth node N4 may be a node connected to an anode electrode AE of the light emitting element LD. A gate electrode of the sixth transistor TR6 may be connected to the i-th emission control line ELi. Accordingly, the sixth transistor TR6 may be turned on in response to an emission control signal EM of the i-th emission control line ELi.

The seventh transistor TR7 may be connected between the fourth node N4 and the initialization power source node VINTN. A gate electrode of the seventh transistor TR7 may be connected to the i-th fourth scan line SL4*i*. Accordingly, the seventh transistor TR7 may be turned on in response to a scan signal of the i-th fourth scan line SL4*i*. In case that the seventh transistor TR7 is turned on, the voltage of the initialization power source node VINTN may be applied to the anode electrode AE of the light emitting element LD.

The pixel circuit PXC may further include a first capacitor Cst and a second capacitor Chold.

The first capacitor Cst may be connected between the first driving power source node ELVDDN and the third node N3. The first capacitor Cst may store a voltage applied to the third node N3.

The second capacitor Chold may be connected between the first node N1 and the third node N3. The second capacitor Chold may store a voltage differential between the first node N1 and the third node N3. For example, the second capacitor Chold may store a voltage corresponding to a data signal and a threshold voltage of the first transistor TR1.

The light emitting element LD may include the anode electrode AE, a cathode electrode CE, and a light emitting layer. The light emitting layer may be disposed between the anode electrode AE and the cathode electrode CE. In case that emission control signals are applied to the i-th emission control line ELi after the data signal transmitted through the j-th data line DLj is reflected in the voltage of the first node N1, the first and sixth transistors TR1 and TR6 may be turned on. Accordingly, the light emitting element LD may emit light according to the amount of current flowing from the first driving power source node ELVDDN to the second driving power source node ELVSSN.

Figure 4:
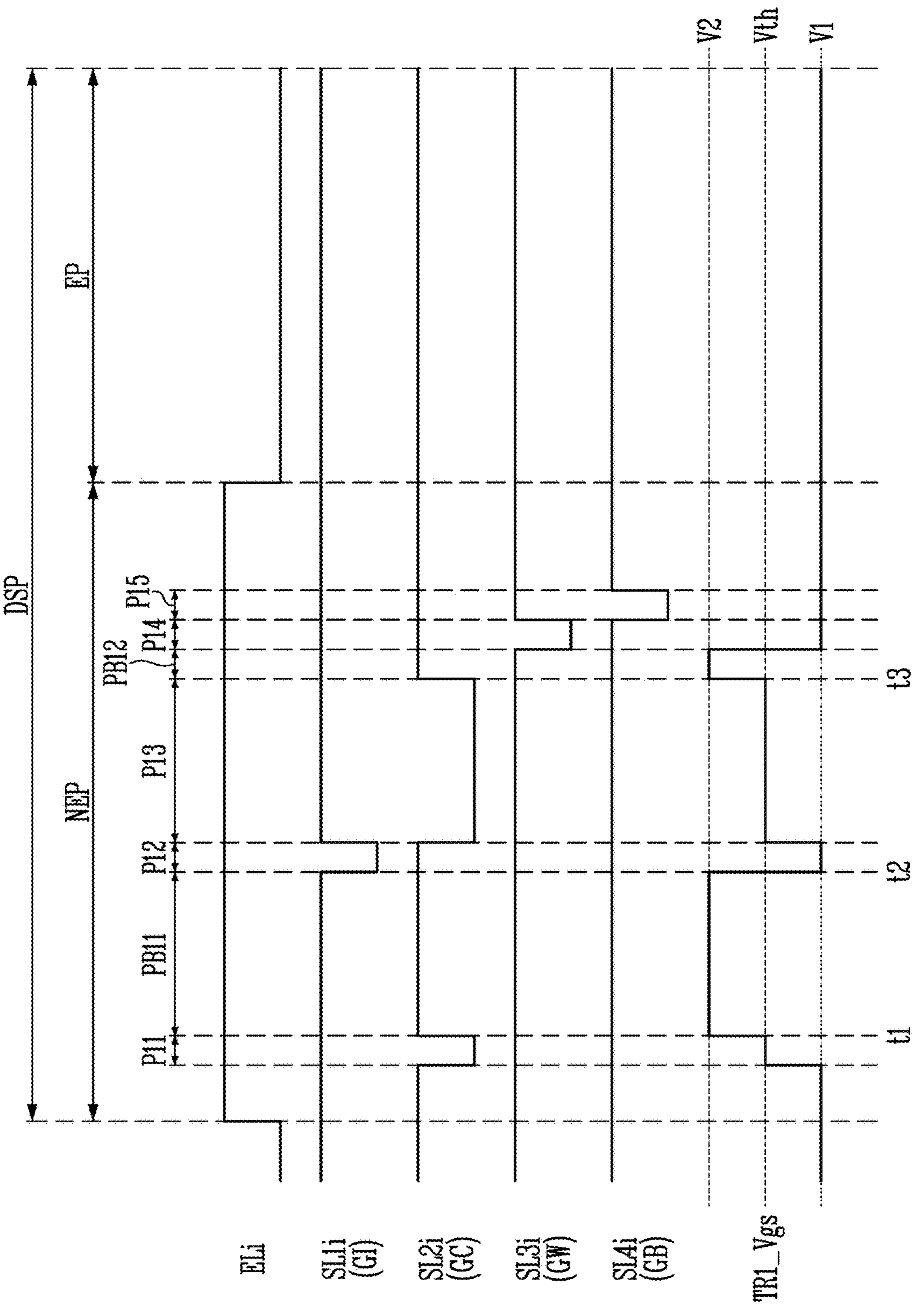
FIG. 4 is a timing diagram illustrating an embodiment of signals supplied to the pixel of FIG. 3.

FIG. 4 is a timing diagram illustrating an embodiment of signals supplied to the pixel of FIG. 3.

Referring to FIGS. 3 and 4, a display scan period DSP may include a non-emission period NEP and an emission period EP. The emission period EP may be a period during which the emission control signal applied to the i-th emission control line ELi has a logic low level. For example, the non-emission period NEP may be a period other than the emission period EP.

According to an embodiment, a second scan signal GC may be applied multiple times within the non-emission period NEP. The second scan signal GC may be applied during the non-emission period NEP in which the emission control signal applied to the i-th emission control line ELi transitions sequentially from high to low, then from low to high, followed by another transition from high to low and back to high. For example, the second scan signal GC may be applied during a first period P11 and a third period P13. For example, after the first period P11 in which the second scan signal GC is applied, a first bias period PB11 in which an off-bias voltage V2 is applied to the first transistor TR1 may be provided. By maintaining the first bias period PB11 for a selected period, the influence of previous data can be further reduced.

In the first period P11 of the non-emission period NEP, the second scan signal GC may be applied to the i-th second scan line SL2*i*. In the first period P11, the second scan signal GC may be applied as a voltage of a logic low level to gate electrodes of the third and fifth transistors TR3 and TR5. The third and fifth transistors TR3 and TR5 may be turned on in response to the second scan signal GC.

For example, the first transistor TR1 may be connected in the form of a diode by the third transistor TR3 that is turned on. A voltage difference reduced by a threshold voltage Vth of the first transistor TR1 from a voltage of the first driving power source node ELVDDN may be applied to the gate electrode of the first transistor TR1. For example, the voltage difference between the voltage of the first driving power source node ELVDDN and the threshold voltage Vth of the first transistor TR1 may be a compensation voltage that compensates for the threshold voltage Vth of the first transistor TR1.

In the first period P11, as the compensation voltage is applied to the gate electrode of the first transistor TR1, a voltage TR1_Vgs between the gate electrode and the source electrode of the first transistor TR1 may have the threshold voltage Vth.

After the first period P11, in the first bias period PB11 of the non-emission period NEP, the application of the second scan signal GC may be stopped. In the first bias period PB11, the second scan signal GC may be applied as a voltage of a logic high level to the gate electrodes of the third and fifth transistors TR3 and TR5. The third and fifth transistors TR3 and TR5 may be turned off in response to the second scan signal GC.

At a start time point t1 of the first bias period PB11, the second scan signal GC may transition (or change) from the logic low level to the logic high level. At a rising edge of the second scan signal GC, a kickback phenomenon in which the voltage of the first node N1 rises may occur. Due to the rise of the voltage of the first node N1, in the first bias period PB11, the voltage TR1_Vgs between the gate electrode and the source electrode of the first transistor TR1 may have the off-bias voltage V2. For example, the off-bias voltage V2 may be a voltage at which the first transistor TR1 is turned off. For example, the off-bias voltage V2 may have a positive voltage. Accordingly, the first transistor TR1 may be in an off-biased state. For example, by utilizing the kickback phenomenon at the rising edge of the second scan signal GC, the voltage TR1_Vgs between the gate electrode and the source electrode of the first transistor TR1 may have a constant voltage regardless of a previous data voltage.

In a second period P12 of the non-emission period NEP, a first scan signal GI may be applied to the i-th first scan line SL1*i*. In the second period P12, the first scan signal GI may be applied as a voltage of a logic low level to the gate electrode of the fourth transistor TR4. The fourth transistor TR4 may be turned on in response to the first scan signal GI.

The voltage of the initialization power source node VINTN may be applied to the gate electrode of the first transistor TR1 through the fourth transistor TR4 that is turned on. The first node N1 connected to the gate electrode of the first transistor TR1 may be initialized with the voltage of the initialization power source node VINTN. For example, the voltage of the initialization power source node VINTN may have a negative voltage lower than the voltage of the second driving power source node ELVSSN. The second period P12 may be referred to as an initialization period.

In the second period P12, as the initialization voltage is applied to the gate electrode of the first transistor TR1, the voltage TR1_Vgs between the gate electrode and the source electrode of the first transistor TR1 may have an on-bias voltage V1. For example, the on-bias voltage V1 may be a voltage at which the first transistor TR1 is turned on. For example, the on-bias voltage V1 may have a negative voltage. For example, the on-bias voltage V1 may be lower than the threshold voltage Vth. Accordingly, the first transistor TR1 may be in an on-biased state.

According to an embodiment, in case that the on-bias voltage V1 is continuously applied to the voltage TR1_Vgs between the gate electrode and the source electrode of the first transistor TR1, holes (for example, positive electric charge) may be trapped at the gate electrode. An afterimage such as image dragging or the like may be visually recognized due to changes in the bias state of the first transistor TR1 caused by hole trapping, shifts in the threshold voltage Vth caused by changes in the hysteresis characteristics, or the like. To improve this afterimage, the occurrence of hole trapping may be reduced by alternately applying the on-bias voltage V1 and the off-bias voltage V2 to the voltage TR1_Vgs between the gate electrode and the source electrode of the first transistor TR1.

As an example, between the first period P11 and the second period P12, the first transistor TR1 may be maintained in the off-biased state. For example, the first bias period PB11 during which scan signals are not supplied may be provided between the first period P11 and the second period P12. The first bias period PB11 may be a period during which the voltage TR1_Vgs between the gate electrode and the source electrode of the first transistor TR1 has the off-bias voltage V2 due to the kickback phenomenon of the second scan signal GC. However, the first bias period PB11 may be set to have sufficient time. For example, the first bias period PB11 may be set to be one horizontal period or more, as a period from the time point t1 in case that the application of the second scan signal GC is stopped to a time point t2 in case that the application of the first scan signal GI starts. By maintaining the first bias period PB11 for more than one horizontal period, the off-bias voltage V2 may be sufficiently applied to the first transistor TR1. Through this, the occurrence of hole trapping may be effectively reduced, thereby alleviating, eliminating, or minimizing the afterimage.

For example, one horizontal period may mean a time period during which data signals are applied to pixels in each row. For example, the horizontal period may be a time period during which a third scan signal GW has a gate-on voltage. For example, the horizontal period may be a time period during which a data signal corresponding to the pixel PXLij is applied to the j-th data line DLj.

After the second period P12, in the third period P13 of the non-emission period NEP, the second scan signal GC may be applied to the i-th second scan line SL2*i*. In the third period P13, the second scan signal GC may be applied as the voltage of the logic low level to the gate electrodes of the third and fifth transistors TR3 and TR5. The third and fifth transistors TR3 and TR5 may be turned on in response to the second scan signal GC.

For example, a voltage difference reduced by the threshold voltage Vth of the first transistor TR1 from the voltage of the first driving power source node ELVDDN may be applied to the gate electrode of the first transistor TR1. During the third period P13, as the application of the second scan signal GC is maintained, the threshold voltage Vth of the first transistor TR1 may be compensated for a sufficient amount of time.

In the third period P13, as a compensation voltage is applied to the gate electrode of the first transistor TR1, the voltage TR1_Vgs between the gate electrode and the source electrode of the first transistor TR1 may have the threshold voltage Vth.

After the third period P13, in a second bias period PB12 of the non-emission period NEP, the application of the second scan signal GC may be stopped. In the second bias period PB12, the second scan signal GC may be applied as the voltage of the logic high level to the gate electrodes of the third and fifth transistors TR3 and TR5. The third and fifth transistors TR3 and TR5 may be turned off in response to the second scan signal GC.

At a start time point t3 of the second bias period PB12, the second scan signal GC may transition (or change) from the logic low level to the logic high level. At a rising edge of the second scan signal GC, the kickback phenomenon in which the voltage of the first node N1 rises may occur. Due to the rise of the voltage of the first node N1, in the second bias period PB12, the voltage TR1_Vgs between the gate electrode and the source electrode of the first transistor TR1 may have the off-bias voltage V2. Accordingly, the first transistor TR1 may be in the off-biased state.

After the second bias period PB12, in a fourth period P14 of the non-emission period NEP, the third scan signal GW may be applied to the i-th third scan line SL3*i*. In the fourth period P14, the third scan signal GW may be applied as a voltage of a logic low level to the gate electrode of the second transistor TR2. The second transistor TR2 may be turned on in response to the third scan signal GW. The second transistor TR2 that is turned on may transmit (or transfer) a data voltage corresponding to the data signal to an electrode (for example, a source electrode) of the fifth transistor TR5. Accordingly, a voltage of the third node N3 may be the data voltage. The fourth period P14 may be referred to as a data writing period.

The voltage of the first driving power source node ELVDDN and the data voltage may be applied to both ends of the first capacitor Cst. The first capacitor Cst may store a voltage difference between the voltage of the first driving power source node ELVDDN and the data voltage.

A voltage difference between the compensation voltage of the first transistor TR1 and the data voltage may be stored at both ends of the second capacitor Chold.

After the fourth period P14, in a fifth period P15 of the non-emission period NEP, a fourth scan signal GB may be applied to the i-th fourth scan line SL4*i*. In the fifth period P15, the fourth scan signal GB may be applied as a voltage of a logic low level to the gate electrode of the seventh transistor TR7. The seventh transistor TR7 may be turned on in response to the fourth scan signal GB. The seventh transistor TR7 that is turned on may transmit (or transfer) the voltage of the initialization power source node VINTN to the anode electrode AE of the light emitting element LD (or the fourth node N4). For example, a threshold voltage of the light emitting element LD may be compensated.

Figure 5:
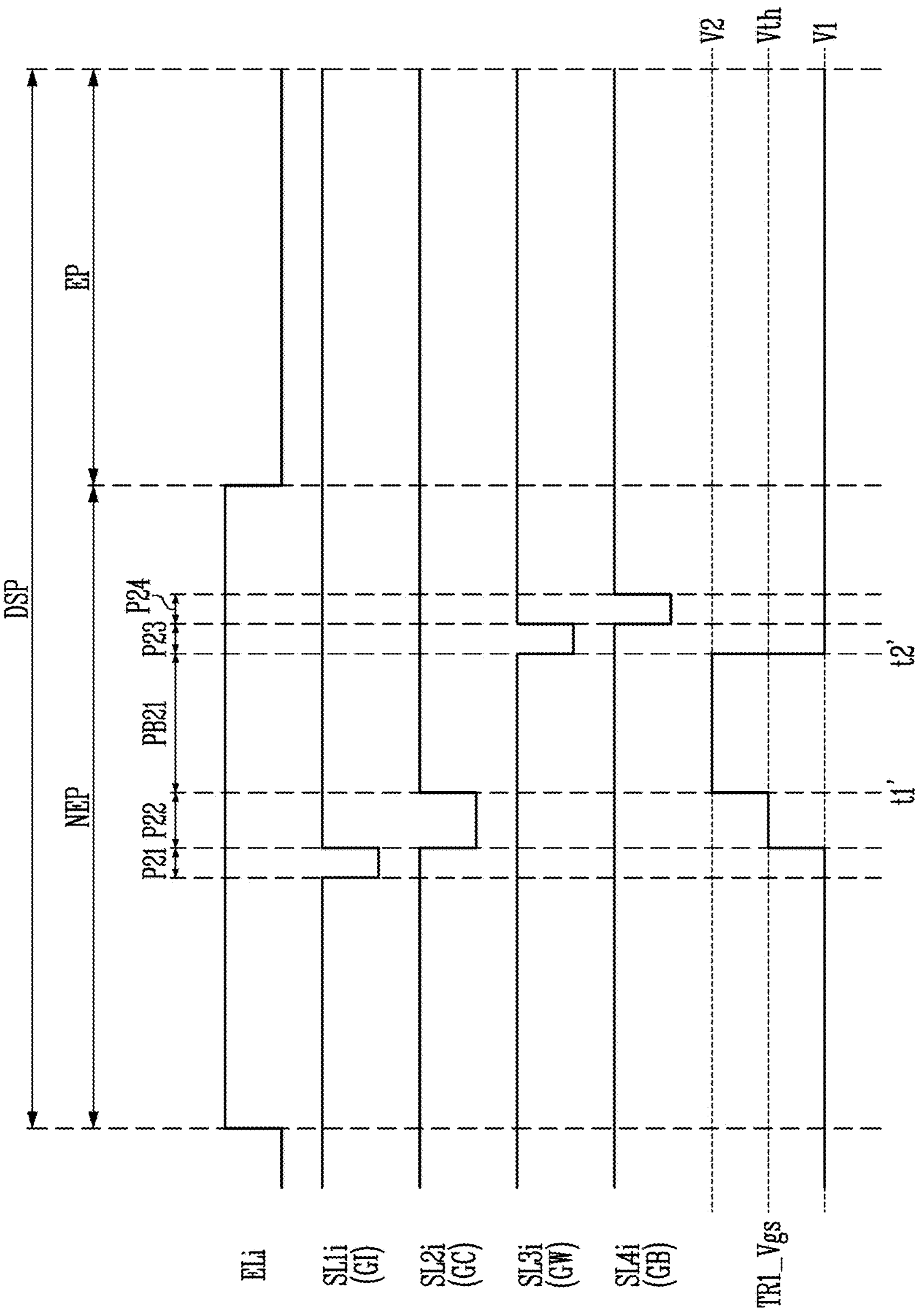
FIG. 5 is a timing diagram illustrating another embodiment of signals supplied to the pixel of FIG. 3.

FIG. 5 is a timing diagram illustrating another embodiment of signals supplied to the pixel of FIG. 3.

Referring to FIGS. 3 and 5, the second scan signal GC may be applied once within the non-emission period NEP. The second scan signal GC may be applied during the non-emission period NEP in which the emission control signal applied to the i-th emission control line ELi transitions from high to low and then from low to high. For example, the second scan signal GC may be applied in a second period P22. For example, after the second period P22 in which the second scan signal GC is applied, a bias period PB21 in which the off-bias voltage V2 is applied to the first transistor TR1 may be provided. By maintaining the bias period PB21 for a selected period, the influence of previous data may be further reduced.

In a first period P21 of the non-emission period NEP, the first scan signal GI may be applied to the i-th first scan line SL1*i*. In the first period P21, the first scan signal GI may be applied as a voltage of a logic low level to the gate electrode of the fourth transistor TR4. The fourth transistor TR4 may be turned on in response to the first scan signal GI.

For example, the voltage of the initialization power source node VINTN may be applied to the gate electrode of the first transistor TR1 by the fourth transistor TR4 that is turned on. A gate voltage of the first transistor TR1 may be initialized with the voltage of the initialization power source node VINTN. As the initialization voltage is applied to the gate electrode of the first transistor TR1, the voltage TR1_Vgs between the gate electrode and the source electrode of the first transistor TR1 may have the on-bias voltage V1. Accordingly, the first transistor TR1 may be in the on-biased state.

After the first period P21, in the second period P22 of the non-emission period NEP, the second scan signal GC may be applied to the i-th second scan line SL2*i*. In the second period P22, the second scan signal GC may be applied as the voltage of the logic low level to the gate electrodes of the third and fifth transistors TR3 and TR5. The third and fifth transistors TR3 and TR5 may be turned on in response to the second scan signal GC.

For example, a voltage differential reduced by the threshold voltage Vth of the first transistor TR1 from the voltage of the first driving power source node ELVDDN may be applied to the gate electrode of the first transistor TR1 by the third transistor TR3 that is turned on. As a compensation voltage is applied to the gate electrode of the first transistor TR1, the voltage TR1_Vgs between the gate electrode and the source electrode of the first transistor TR1 may have the threshold voltage Vth.

After the second period P22, in the bias period PB21 of the non-emission period NEP, the application of the second scan signal GC may be stopped. In the bias period PB21, the second scan signal GC may be applied as the voltage of the logic high level to the gate electrodes of the third and fifth transistors TR3 and TR5. At a start time point t1' of the bias period PB21, the second scan signal GC may transition (or change) from the logic low level to the logic high level. At a rising edge of the second scan signal GC, the kickback phenomenon in which the voltage of the first node N1 rises may occur. Due to the rise of the voltage of the first node N1, in the bias period PB21, the voltage TR1_Vgs between the gate electrode and the source electrode of the first transistor TR1 may have the off-bias voltage V2. For example, the off-bias voltage V2 may be a voltage at which the first transistor TR1 is turned off. For example, the off-bias voltage V2 may have a positive voltage. Accordingly, the first transistor TR1 may be in the off-biased state.

After the bias period PB21, in a third period P23 of the non-emission period NEP, the third scan signal GW may be applied to the i-th third scan line SL3*i*. In the third period P23, the third scan signal GW may be applied as a voltage of a logic low level to the gate electrode of the second transistor TR2. The second transistor TR2 may be turned on in response to the third scan signal GW. The second transistor TR2 that is turned on may transmit (or transfer) a data voltage corresponding to the data signal to an electrode (for example, a source electrode) of the fifth transistor TR5. Accordingly, the voltage of the third node N3 may be the data voltage.

According to an embodiment, between the second period P22 and the third period P23, the first transistor TR1 may be maintained in the off-biased state. The bias period PB21 between the second period P22 and the third period P23 may be set to have sufficient time. For example, the bias period PB21 may be set to be one horizontal period or more, as a period from the time point t1' in case that the application of the second scan signal GC is stopped to a time point t2' in case that the application of the third scan signal GW starts. By maintaining the bias period PB21 for more than one horizontal period, the off-bias voltage V2 may be sufficiently applied to the first transistor TR1. Through this, the occurrence of hole trapping may be effectively reduced, thereby alleviating, eliminating, or minimizing the afterimage.

For example, in case that a strong on-bias voltage V1 is applied to the voltage TR1_Vgs between the gate electrode and the source electrode of the first transistor TR1, the threshold voltage of the first transistor TR1 may shift due to a change in the hysteresis characteristic, so that an afterimage may be visually recognized. However, by applying the second scan signal GC that rises the voltage of the first node N1 through the kickback phenomenon, the off-bias voltage V2 may be applied to the voltage TR1_Vgs between the gate electrode and the source electrode of the first transistor TR1 during the bias period PB21. Accordingly, by alternately applying the on-bias voltage V1 and the off-bias voltage V2 to the voltage TR1_Vgs between the gate electrode and the source electrode of the first transistor TR1, the occurrence of hole trapping may be reduced, thereby alleviating, eliminating, or minimizing the afterimage.

After the third period P23, in a fourth period P24 of the non-emission period NEP, the fourth scan signal GB may be applied to the i-th fourth scan line SL4*i*. In the fifth period P15, the fourth scan signal GB may be applied as a voltage of a logic low level to the gate electrode of the seventh transistor TR7. The seventh transistor TR7 may be turned on in response to the fourth scan signal GB. The seventh transistor TR7 that is turned on may transmit (or transfer) the voltage of the initialization power source node VINTN to the anode electrode AE of the light emitting element LD (or the fourth node N4).

Figure 6:
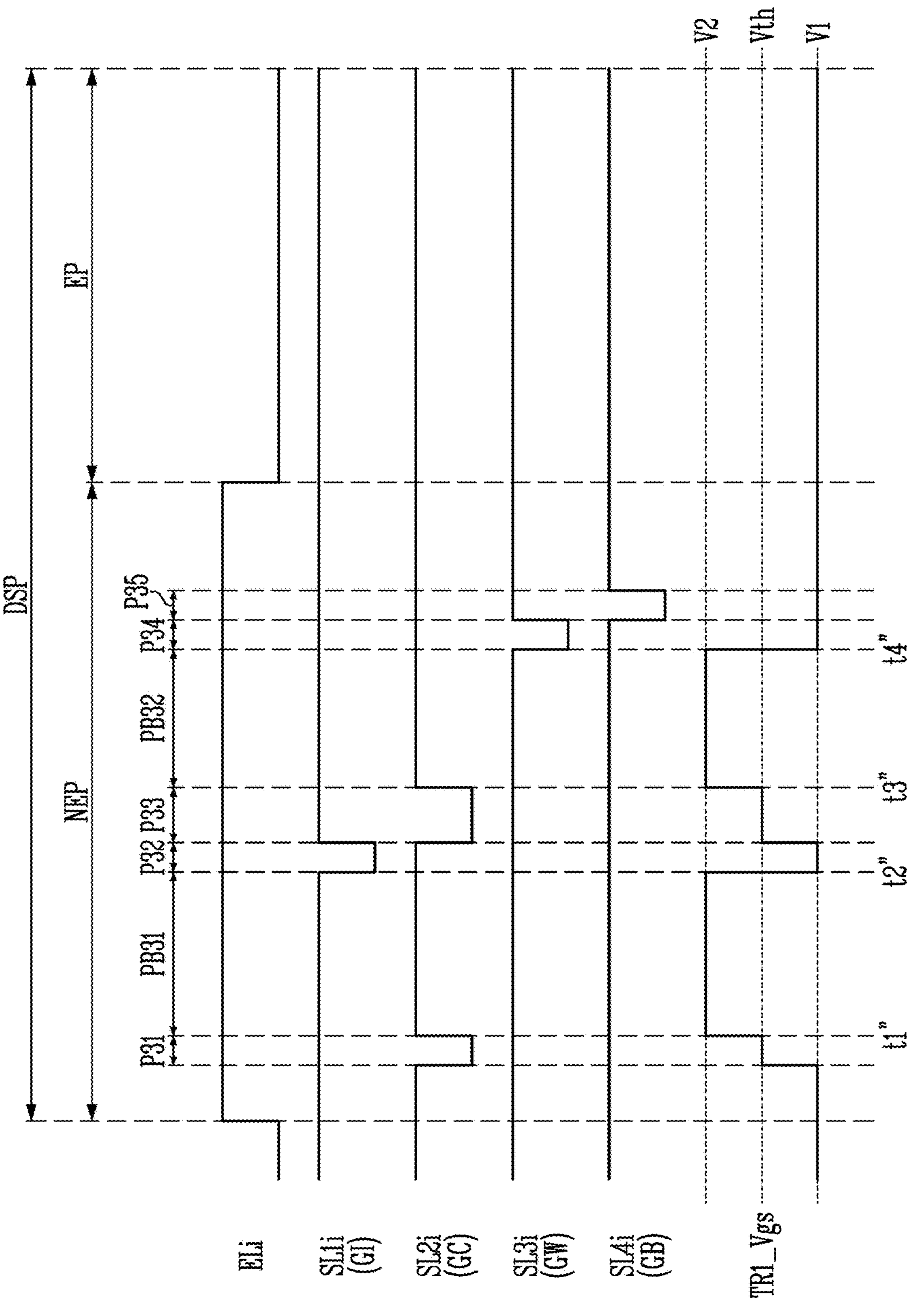
FIG. 6 is a timing diagram illustrating still another embodiment of signals supplied to the pixel of FIG. 3.

FIG. 6 is a timing diagram illustrating still another embodiment of signals supplied to the pixel of FIG. 3.

Referring to FIGS. 3 and 6, the second scan signal GC may be applied multiple times within the non-emission period NEP. The second scan signal GC may be applied in the non-emission period NEP in which the emission control signal applied to the i-th emission control line ELi transitions sequentially from high to low, then from low to high, followed by another transition from high to low and back to high. For example, the second scan signal GC may be applied in a first period P31 and a third period P33. For example, a first bias period PB31 after the first period P31 in which the second scan signal GC is applied, and a second bias period PB32 after the third period P33 may be provided. By maintaining the first and second bias periods PB31 and PB32 in which the off-bias voltage V2 is applied to the first transistor TR1 for a selected period, the influence of previous data may be further reduced.

In the first period P31 of the non-emission period NEP, the second scan signal GC may be applied to the i-th second scan line SL2*i*. In the first period P31, the second scan signal GC may be applied as a voltage of a logic low level to the gate electrodes of the third and fifth transistors TR3 and TR5. The third and fifth transistors TR3 and TR5 may be turned on in response to the second scan signal GC.

For example, a voltage difference reduced by the threshold voltage Vth of the first transistor TR1 from the voltage of the first driving power source node ELVDDN may be applied to the gate electrode of the first transistor TR1. In the first period P31, as a compensation voltage is applied to the gate electrode of the first transistor TR1, the voltage TR1_Vgs between the gate electrode and the source electrode of the first transistor TR1 may have the threshold voltage Vth.

After the first period P31, in the first bias period PB31 of the non-emission period NEP, the application of the second scan signal GC may be stopped, and the third and fifth transistors TR3 and TR5 may be turned off.

At a start time point t1" of the first bias period PB31, the second scan signal GC may transition (or change) from the logic low level to a logic high level. Due to the kickback phenomenon in which the voltage of the first node N1 rises at the rising edge of the second scan signal GC, the voltage TR1_Vgs between the gate electrode and the source electrode of the first transistor TR1 may have the off-bias voltage V2 in the first bias period PB31. Accordingly, the first transistor TR1 may be in an off-biased state. For example, the voltage TR1_Vgs between the gate electrode and the source electrode of the first transistor TR1 may have a constant voltage regardless of a previous data voltage.

The first bias period PB31 between the first period P31 and a second period P32 may be set to one horizontal period or more. For example, the first bias period PB11 may be set to be one horizontal period or more, as a period from the time point t1" in case that the application of the second scan signal GC is stopped to a time point t2" in case that the application of the first scan signal GI starts. By maintaining the first bias period PB31 for more than one horizontal period, the off-bias voltage V2 may be sufficiently applied to the first transistor TR1.

In the second period P32 of the non-emission period NEP, the first scan signal GI may be applied to the i-th first scan line SL1*i*. In the second period P32, the first scan signal GI may be applied as a voltage of a logic low level to the gate electrode of the fourth transistor TR4. The fourth transistor TR4 may be turned on in response to the first scan signal GI, and the voltage of the initialization power source node VINTN may be applied to the gate electrode of the first transistor TR1. Accordingly, in the second period P32, the voltage TR1_Vgs between the gate electrode and the source electrode of the first transistor TR1 may have the on-bias voltage V1. For example, the on-bias voltage V1 may be a voltage at which the first transistor TR1 is turned on and may have a negative voltage. Accordingly, the first transistor TR1 may be in an on-biased state.

After the second period P32, in the third period P33 of the non-emission period NEP, the second scan signal GC may be applied to the i-th second scan line SL2*i*. In the third period P33, the second scan signal GC may be applied as the voltage of the logic low level to the gate electrodes of the third and fifth transistors TR3 and TR5. The third and fifth transistors TR3 and TR5 may be turned on in response to the second scan signal GC.

For example, a voltage difference reduced by the threshold voltage Vth of the first transistor TR1 from the voltage of the first driving power source node ELVDDN may be applied to the gate electrode of the first transistor TR1. Accordingly, during the third period P33, the voltage TR1_Vgs between the gate electrode and the source electrode of the first transistor TR1 may have the threshold voltage Vth.

After the third period P33, in the second bias period PB32 of the non-emission period NEP, the application of the second scan signal GC may be stopped, and the third and fifth transistors TR3 and TR5 may be turned off.

At a start time point t3" of the second bias period PB12, the second scan signal GC may transition (or change) from the logic low level to the logic high level. Due to the kickback phenomenon in which the voltage of the first node N1 rises at the rising edge of the second scan signal GC, the voltage TR1_Vgs between the gate electrode and the source electrode of the first transistor TR1 may have the off-bias voltage V2 in the second bias period PB32. For example, the off-bias voltage V2 may be a voltage at which the first transistor TR1 is turned off. For example, the off-bias voltage V2 may have a positive voltage. Accordingly, the first transistor TR1 may be in an off-biased state.

The second bias period PB32 between the third period P33 and a fourth period P34 may be set to one horizontal period or more. For example, the second bias period PB32 may be set to be one horizontal period or more, as a period from the time point t3" in case that the application of the second scan signal GC is stopped to a time point t4" in case that the application of the first scan signal GI starts. By maintaining the second bias period PB32 for more than one horizontal period, the off-bias voltage V2 may be sufficiently applied to the first transistor TR1.

After the second bias period PB32, in the fourth period P34 of the non-emission period NEP, the third scan signal GW may be applied to the i-th third scan line SL3*i*. In the fourth period P14, the third scan signal GW may be applied as a voltage of a logic low level to the gate electrode of the second transistor TR2. The second transistor TR2 may be turned on in response to the third scan signal GW and may transmit (or transfer) a data voltage corresponding to the data signal to an electrode (for example, the source electrode) of the fifth transistor TR5. In the fourth period P34, as the voltage of the data signal is applied to the gate electrode of the first transistor TR1, the voltage TR1_Vgs between the gate electrode and the source electrode of the first transistor TR1 may have the on-bias voltage V1. Accordingly, the first transistor TR1 may be in the on-biased state.

After the fourth period P34, in a fifth period P35 of the non-emission period NEP, the fourth scan signal GB may be applied to the i-th fourth scan line SL4*i*. In the fifth period P35, the fourth scan signal GB may be applied as a voltage of a logic low level to the gate electrode of the seventh transistor TR7. The seventh transistor TR7 may be turned on in response to the fourth scan signal GB and may transmit (or transfer) the voltage of the initialization power source node VINTN to the anode electrode AE of the light emitting element LD (or the fourth node N4). In the fifth period P35, the first transistor TR1 may be maintained in the on-biased state.

As described above, in case that the second scan signal GC is applied once within the non-emission period NEP, the initialization power source node VINTN may have a lower voltage level than in case that the second scan signal GC is applied twice. This may be disadvantageous in terms of power consumption because a low voltage applied to the scan driver 200 (see FIG. 1) has a lower level. For example, even considering the increase in load due to toggling for generating scan signals, a case where the second scan signal GC is applied twice may be advantageous in terms of power consumption compared to a case where the second scan signal GC is applied once.

Figure 7:
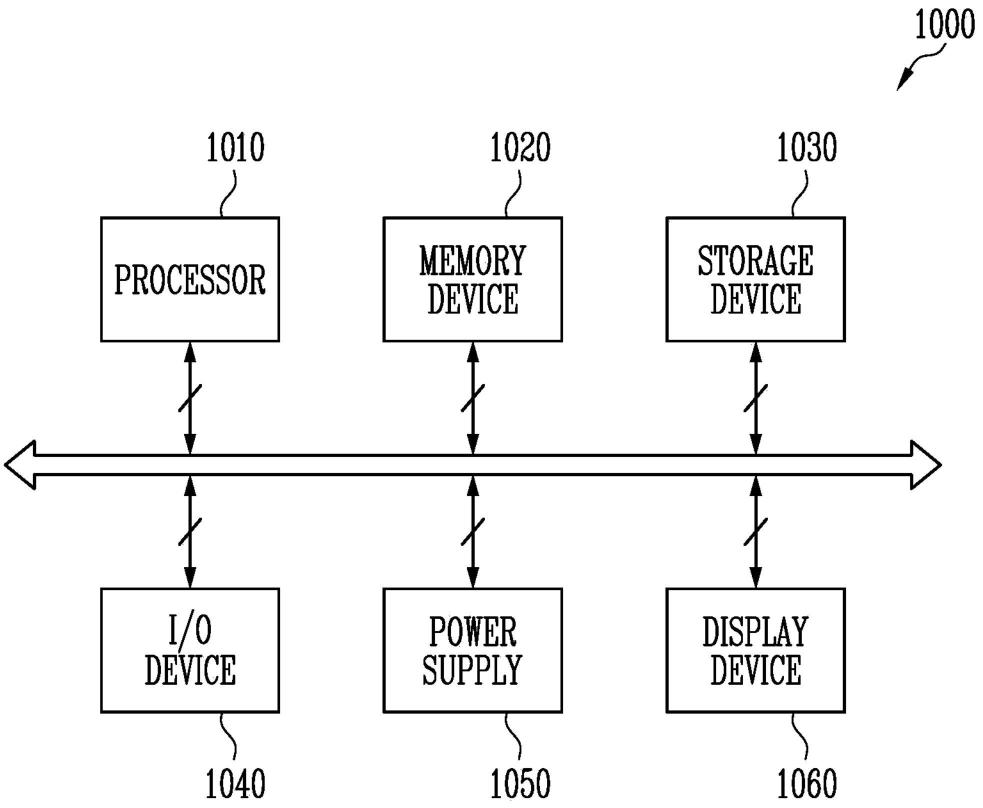
FIG. 7 is a schematic block diagram of an embodiment of an electronic device including a display device according to an embodiment.

FIG. 7 is a schematic block diagram schematically illustrating an embodiment of an electronic device including a display device according to an embodiment.

Referring to FIG. 7, an electronic device 1000 may include a processor 1010, a memory device 1020, a storage device 1030, an input/output device 1040, a power supply 1050, and a display device 1060. The display device 1060 may be the display device DD of FIG. 1. For example, the electronic device 1000 may further include several ports that can communicate with a video card, a sound card, a memory card, a universal serial bus (USB) device, and the like, or with other systems. In an embodiment, the electronic device 1000 may be implemented as a smartphone. In another embodiment, the electronic device 1000 may be implemented as a tablet PC. However, these are examples, and the electronic device 1000 is not limited thereto. For example, the electronic device 1000 may be implemented as a mobile phone, a video phone, a smart pad, a smart watch, a vehicle navigation system, a computer monitor, a laptop PC, a head-mounted display device, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, and the like. According to an embodiment, the processor 1010 may also be connected to an expansion bus, such as a peripheral component interconnect (PCI) bus. According to an embodiment, the processor 1010 may provide input image data to the display device 1060, and thus, the display device 1060 may display an image based on the input image data provided from the processor 1010.

The memory device 1020 may store data necessary for the operation of the electronic device 1000. For example, the memory device 1020 may include a non-volatile memory device such as an EPROM (erasable programmable read-only memory) device, an EEPROM (electrically erasable programmable read-only memory) device, a flash memory device, a PRAM (phase change random access memory) device, a RRAM (resistance random access memory) device, a NFGM (nano floating gate memory) device, a PoRAM (polymer random access memory) device, a MRAM (magnetic random access memory) device, or a FRAM (ferroelectric random access memory) device, and/or a volatile memory device such as a DRAM (dynamic random access memory) device, a SRAM (static random access memory) device, or a mobile DRAM device.

The storage device 1030 may include a solid state drive (SSD), a hard disk drive (HDD), a compact disc read only memory (CD-ROM), or the like.

The input/output device 1040 may include an input means such as a keyboard, a keypad, a touchpad, a touch screen, and a mouse, and an output means such as a speaker and a printer. According to an embodiment, the display device 1060 may be included in the input/output device 1040.

The power supply 1050 may supply power sources required to operate the electronic device 1000. For example, the power supply 1050 may be a power management integrated circuit (PMIC). In an embodiment, the power supply 1050 may supply power sources to the display device 1060.

The display device 1060 may display an image corresponding to visual information of the electronic device 1000. The display device 1060 may be connected to other components through the buses or other communication links.

In the display device according to the embodiments, the driving transistor may have an off-bias voltage during a bias period due to a kickback phenomenon occurred at a rising edge of the second scan signal GC. For example, by maintaining the bias period for more than one horizontal period, the display quality may be improved by preventing an afterimage from being visually recognized in an image.

According to the embodiments, a pixel, a display device, and an electronic device having improved display quality may be provided.

Effects according to the embodiments are not limited by the above-described contents, and more various other effects are included in the specification.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A pixel comprising:

a first transistor including a gate electrode connected to a first node, the first transistor connected between a second node and a first driving power source node to which a first driving power source is supplied;

a second transistor connected between a data line and a third node, the second transistor including a gate electrode electrically connected to a first scan line;

a third transistor connected between the first node and the second node, the third transistor including a gate electrode electrically connected to a second scan line;

a fourth transistor connected between the first node and an initialization power source node to which an initialization power source is supplied, the fourth transistor including a gate electrode electrically connected to a third scan line;

a fifth transistor connected between the third node and a reference power source node to which a reference power source is supplied, the fifth transistor including a gate electrode electrically connected to the second scan line;

a sixth transistor connected between the second node and a fourth node, the sixth transistor including a gate electrode electrically connected to an emission control line; and a light emitting element connected to the fourth node, wherein in a non-emission period in which the sixth transistor is turned off, at least one second scan signal is applied to the second scan line, and after the at least one second scan signal is applied, an off-bias voltage is applied to the first transistor during a bias period when the fourth transistor is turned off in response to a third scan signal applied to the third scan line.

2. The pixel of claim 1, wherein during the bias period, a voltage obtained by subtracting a voltage of a source electrode from a voltage of the gate electrode of the first transistor has a positive voltage.

3. The pixel of claim 1, further comprising:

a seventh transistor connected between the initialization power source node and the fourth node, the seventh transistor including a gate electrode electrically connected to a fourth scan line; and a first capacitor connected between the first driving power source node and the third node.

4. The pixel of claim 3, wherein the first, second, third, fourth, fifth, sixth, and seventh transistors are P-type low-temperature poly-silicon (LTPS) transistors.

5. The pixel of claim 1, wherein the bias period is set to one horizontal period or more.

6. The pixel of claim 5, wherein in the non-emission period, the second scan signal is applied during a first period, and a third scan signal is applied to the third scan line during a second period after the first period, and the bias period is comprises a period between the first period and the second period.

7. The pixel of claim 6, wherein in the non-emission period, the second scan signal is applied again during a third period after the second period, and a first scan signal is applied to the first scan line during a fourth period after the third period, and the bias period comprises a period between the third period and the fourth period.

8. The pixel of claim 6, wherein during the first period, the third and fifth transistors are turned on, and a voltage obtained by subtracting a threshold voltage of the first transistor from a voltage of the first driving power source is applied to the gate electrode of the first transistor.

9. The pixel of claim 8, wherein during the second period, the fourth transistor is turned on, and a voltage of the initialization power source is applied to the gate electrode of the first transistor.

10. The pixel of claim 5, wherein in the non-emission period, a third scan signal is applied to the third scan line during a first period, a second scan signal is applied during a second period after the first period, and a first scan signal is applied to the third scan line during a third period after the second period, and the bias period is a period between the second period and the third period.

11. The pixel of claim 10, wherein during the second period, the third and fifth transistors are turned on, and a voltage obtained by subtracting a threshold voltage of the first transistor from a voltage of the first driving power source is applied to the gate electrode of the first transistor.

12. The pixel of claim 11, wherein during the third period, the second transistor is turned on, and a voltage of the data line is applied to the gate electrode of the first transistor.

13. A display device comprising:

pixels connected to scan lines, emission control lines, and data lines; and a scan driver that drives the scan lines, wherein each of the pixels includes:

a first transistor including a gate electrode connected to a first node, the first transistor connected between a second node and a first driving power source node to which a first driving power source is supplied;

a second transistor connected between a data line and a third node, the second transistor including a gate electrode electrically connected to a first scan line;

a third transistor connected between the first node and the second node, the third transistor including a gate electrode electrically connected to a second scan line;

a fourth transistor connected between the first node and an initialization power source node to which an initialization power source is supplied, the fourth transistor including a gate electrode electrically connected to a third scan line;

a fifth transistor connected between the third node and a reference power source node to which a reference power source is supplied, the fifth transistor including a gate electrode electrically connected to the second scan line;

a sixth transistor connected between the second node and a fourth node, the sixth transistor including a gate electrode electrically connected to an emission control line; and a light emitting element connected to the fourth node, wherein in a non-emission period in which the sixth transistor is turned off, at least one second scan signal is applied to the second scan line, and after the at least one second scan signal is applied, an off-bias voltage is applied to the first transistor during a bias period when the fourth transistor is turned off in response to a third scan signal applied to the third scan line.

14. The display device of claim 13, wherein during the bias period, a voltage obtained by subtracting a voltage of a source electrode from a voltage of the gate electrode of the first transistor has a positive voltage.

15. The display device of claim 13, further comprising:

a seventh transistor connected between the initialization power source node and the fourth node, the seventh transistor including a gate electrode electrically connected to a fourth scan line; and a first capacitor connected between the first driving power source node and the third node.

16. The display device of claim 13, wherein the bias period is set to one horizontal period or more.

17. The display device of claim 16, wherein in the non-emission period, the second scan signal is applied during a first period, and a third scan signal is applied to the third scan line during a second period after the first period, and the bias period comprises a period between the first period and the second period.

18. The display device of claim 17, wherein in the non-emission period, the second scan signal is applied again during a third period after the second period, and a first scan signal is applied to the third scan line during a fourth period after the third period, and the bias period comprises a period between the third period and the fourth period.

19. The display device of claim 16, wherein in the non-emission period, a third scan signal is applied to the third scan line during a first period, a second scan signal is applied during a second period after the first period, and a first scan signal is applied to the first scan line during a third period after the second period, and the bias period is a period between the second period and the third period.

20. An electronic device comprising:

a display device including pixels; and a processor that controls the display device, wherein each of the pixels includes:

a first transistor including a gate electrode connected to a first node, the first transistor connected between a second node and a first driving power source node to which a first driving power source is supplied;

a second transistor connected between a data line and a third node, the second transistor including a gate electrode electrically connected to a first scan line;

a third transistor connected between the first node and the second node, the third transistor including a gate electrode electrically connected to a second scan line;

a fourth transistor connected between the first node and an initialization power source node to which an initialization power source is supplied, the fourth transistor including a gate electrode electrically connected to a third scan line;

a fifth transistor connected between the third node and a reference power source node to which a reference power source is supplied, the fifth transistor including a gate electrode electrically connected to the second scan line;

a sixth transistor connected between the second node and a fourth node, the sixth transistor including a gate electrode electrically connected to an emission control line; and a light emitting element connected to the fourth node, wherein in a non-emission period in which the sixth transistor is turned off, at least one second scan signal is applied to the second scan line, and after the at least one second scan signal is applied, an off-bias voltage is applied to the first transistor during a bias period when the fourth transistor is turned off in response to a third scan signal applied to the third scan line.

* * * * *